(12) United States Patent
Carle et al.

(10) Patent No.: US 12,404,868 B2
(45) Date of Patent: Sep. 2, 2025

(54) AERODYNAMIC BEARING FOR AXIAL AND RADIAL MOUNTING OF A SHAFT AND TURBO COMPRESSOR WITH SUCH A BEARING

(71) Applicant: ebm-papst Mulfingen GmbH & Co. KG, Mulfingen (DE)

(72) Inventors: Christoph Carle, Forchtenberg (DE); Philipp Handschuh, Nuertingen (DE); Mihai B. Dobrica, Heidelberg (DE); Michael Wilke, Schrozberg (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 19/041,513

(22) Filed: Jan. 30, 2025

(65) Prior Publication Data
US 2025/0243870 A1 Jul. 31, 2025

(30) Foreign Application Priority Data
Jan. 31, 2024 (DE) .......................... 102024102696.0

(51) Int. Cl.
| | | |
|---|---|---|
| F04D 29/056 | (2006.01) | |
| F04D 17/10 | (2006.01) | |
| F04D 29/42 | (2006.01) | |
| F04D 29/58 | (2006.01) | |

(52) U.S. Cl.
CPC .......... *F04D 29/056* (2013.01); *F04D 17/10* (2013.01); *F04D 29/4206* (2013.01); *F04D 29/582* (2013.01)

(58) Field of Classification Search
CPC .... F04D 29/056; F04D 17/10; F04D 29/4206; F04D 29/582; F04D 13/0633; F04D 29/0413; F04D 29/046; F16C 17/107; F16C 17/10; F16C 17/105; F01D 25/166
See application file for complete search history.

(56) References Cited

U.S. PATENT DOCUMENTS

| | | | | |
|---|---|---|---|---|
| 2,054,219 | A * | 9/1936 | Howarth | F16C 17/10 |
| | | | | 277/420 |
| 11,674,502 | B2 * | 6/2023 | Rohrmann | F03D 80/70 |
| | | | | 384/129 |
| 2008/0038109 | A1 * | 2/2008 | Sandstede | F01D 25/22 |
| | | | | 415/111 |
| 2014/0169707 | A1 * | 6/2014 | Yoshino | F16C 17/024 |
| | | | | 384/105 |
| 2020/0028402 | A1 * | 1/2020 | Looser | F16C 32/0614 |

* cited by examiner

*Primary Examiner* — Eldon T Brockman
(74) *Attorney, Agent, or Firm* — Dickinson Wright PLLC

(57) ABSTRACT

An aerodynamic bearing for mounting a shaft for a turbo compressor having two annular axial bearing disks and a hollow cylindrical radial bearing bush. The two axial bearing disks are spaced apart and form a cavity between them for receiving a shaft sleeve connected to the shaft, and the two axial bearing disks each have an axial bearing surface facing the cavity for forming an axial gas cushion in an axial bearing gap between the axial bearing surface and the shaft sleeve. The radial bearing bush has a radial bearing surface radially inward for forming a radial gas cushion in a radial bearing gap between the radial bearing surface and the shaft for the radial mounting of the shaft, and the radial bearing bush is formed integrally and/or materially with one of the axial bearing disks as a combination bearing bush.

14 Claims, 2 Drawing Sheets

AERODYNAMIC BEARING FOR AXIAL AND RADIAL MOUNTING OF A SHAFT AND TURBO COMPRESSOR WITH SUCH A BEARING

RELATED APPLICATIONS

This application claims priority to German Patent Application No. 10 2024 102 696.0, filed Jan. 31, 2024, the entire contents of which is incorporated herein by reference in its entirety.

FIELD

The disclosure relates to an aerodynamic bearing for the axial and radial mounting of a shaft extending along a rotation axis for a turbo compressor and to a turbo compressor with such a bearing, which is in particular an oil-free high-speed turbo compressor.

BACKGROUND

Aerodynamic bearings, which are also called aerostatic bearings or air bearings, as well as their use in turbo compressors are known in the prior art. The term turbo compressors covers radial, axial and diagonal compressors, wherein radial compressors in particular can, for example, also be referred to as centrifugal compressors or radial compressors.

The basic operating principle of such aerodynamic bearings is that the mounting partners are separated by a thin gas film or a thin gas cushion, so that a highly precise stick-slip-free and friction-free movement is possible between the mounting partners.

With regard to turbo compressors, both an axial bearing and a radial bearing of an impeller of the compressor or a shaft for receiving the impeller are preferably provided by aerodynamic bearings.

In most cases, a shaft sleeve is provided on the shaft which is non-rotationally connected to the shaft and which is arranged between two axial bearing disks to form the axial bearing. In addition, a radial bearing bush is often provided to form the radial bearing.

The problem here is that the axial bearing surfaces formed on the axial bearing disks for axial mounting must be arranged as precisely as possible orthogonal to the rotation axis and the radial bearing surface formed on the radial bearing bush for radial mounting must be arranged as precisely as possible concentrically to the rotation axis in order to enable high wear-free bearing speeds.

The necessary high accuracy of the alignment of the bearing surfaces to the rotation axis and also to each other leads to a correspondingly large effort and correspondingly high costs in production.

In addition, even with essentially contact-free shaft mounting using aerodynamic bearings, the shaft may still heat up adversely during operation.

BRIEF SUMMARY

The present disclosure overcomes the aforementioned disadvantages and provides an aerodynamic bearing for the axial and radial mounting of a shaft, in particular of a turbo compressor, by means of which a cost-effective mounting of the shaft with high bearing accuracy can be achieved.

According to the disclosure, an aerodynamic bearing for the axial and radial mounting of a shaft extending along a rotation axis for a turbo compressor and in particular for a high-speed turbo compressor is therefore proposed. The bearing according to the disclosure has two annular axial bearing disks and a hollow cylindrical radial bearing bush. The two axial bearing disks and the radial bearing bush are arranged concentrically to the rotation axis, wherein the two axial bearing disks are spaced apart in the axial direction and form a cavity between them in the axial direction for receiving a shaft sleeve connected to the shaft. The shaft sleeve can also be referred to as a shaft collar and can be fixed to the shaft by, for example, a fastening element or formed integrally by the shaft. The two axial bearing disks each have an axial bearing surface facing the cavity for forming a respective axial gas cushion in a respective axial bearing gap between the respective axial bearing surface and the shaft sleeve for the axial mounting of the shaft. The radial bearing bush has a radial bearing surface radially inward for forming a radial gas cushion in a radial bearing gap between the radial bearing surface and the shaft for the radial mounting of the shaft. The radial bearing bush is formed integrally and/or materially with one of the axial bearing disks and thus forms a combination bearing bush. Stated another way, the radial bearing bush can be unitarily formed with one of the axial bearing disks, and the combination bearing bush can be a monolithic structure. The resulting one-piece and integral combination bearing bush forms a combination of a radial bearing bush and one of the axial bearing disks, so that both the radial bearing surface and one of the axial bearing surfaces are provided thereon. The combination bearing bush can therefore also be referred to as a combined axial-radial bearing bush.

The bearing described according to the disclosure results in several advantages which also achieve the objects set out above. Since one of the axial bearing disks and the radial bearing bush are integrally formed with each other, they no longer need to be aligned with each other, so that both the separate arrangement and the alignment with each other are no longer necessary. In addition, smaller tolerance chains result during production, since there is not a first tolerance for the axial bearing disk and a second tolerance for the radial bearing bush, but only the tolerance for the combination bearing bush.

This results in greater accuracy while simplifying production and assembly.

However, it is also advantageous that the heat dissipation from the shaft to the outside is improved by the higher mass of the combination bearing bush.

In the context of this description, axial direction, radial direction and circumferential direction refer to the rotation axis, unless otherwise stated in the specific case.

An advantageous variant of the aerodynamic bearing also provides that a spacer disk is arranged in the axial direction between the two axial bearing disks, which spacer disk is designed to hold the axial bearing disks at a predetermined axial distance from each other and/or to limit the cavity in the radial direction, so that the shaft sleeve, when supported as intended between the axial bearing disks by the axial gas cushions, is rotatable. According to the further development, the spacer disk is designed to be integral and/or materially bonded to the combination bearing bush, which in turn results in shortened tolerance chains or smaller overall tolerances, simplified assembly and improved heat dissipation.

Preferably, the spacer disk is ring-shaped and the shaft sleeve is therefore ring-shaped all the way around.

Furthermore, it is preferably provided that the combination bearing bush has a hollow cylindrical shape, the length of which essentially corresponds to an axial length of the radial bearing bush or the common axial length of the radial bearing bush and the axial bearing disk. The outer radius of the combination bearing bush corresponds to the outer radius of the axial bearing disk. In this case, the hollow cylindrical shape does not mean to have a T-shaped outer section contour. Rather, the hollow cylindrical shape and the associated large volume of the combination bearing bush further improves heat dissipation.

In order to avoid or prevent a collision of the combination bearing bush at a transition from the axial bearing surface to the radial bearing surface with the shaft or the shaft sleeve, one variant provides that the axial bearing surface and the radial bearing surface on the combination bearing bush transition through a transition region that runs concentrically around the rotation axis and is in particular concave, which is in particular designed as a undercut.

Due to the aerodynamic mounting, hydrodynamic effects occur both in the radial bearing gap or in the local radial gas cushion and in the axial bearing gap or in the local axial gas cushion, wherein disadvantageous turbulence can occur at a transition between the respective bearing surfaces or gas cushions. Therefore, according to a further variant of the aerodynamic bearing, at least one first venting channel leading to the axial bearing surface and to the radial bearing surface of the combination bearing bush is provided for decoupling the axial gas cushion and the radial gas cushion.

Preferably, the at least one first venting channel leads to the transition region or into the undercut, via which the at least one first venting channel is fluidically connected to the axial bearing surface and the radial bearing surface or the respective air gap.

Furthermore, it is preferably provided that the at least one first venting channel leads from the radial bearing surface to a radially outer surface of the combination bearing bush and/or an axial end face of the combination bearing bush, wherein the end face is understood to be a surface on an end side of the combination bearing bush facing away from the axial bearing surface. The at least one first venting channel is also designed in particular to maintain and/or homogenize an ambient pressure of the combination bearing bush or around the combination bearing bush.

In order to improve the radial mounting and targeted radial support, it can also be provided that the radial bearing surface of the combination bearing bush is divided into at least two radial bearing surface portions spaced apart in the axial direction to form a respective radial gas cushion in a respective radial bearing gap between the respective radial bearing surface portion and the shaft for the radial mounting of the shaft.

In this case, it can further be provided that at least one second venting channel, arranged in particular between two radial bearing surface portions and leading to the radial bearing surface portions or the respective radial bearing gaps, is provided for decoupling the adjacent or immediately adjacent radial gas cushions. The at least one second venting channel can also be provided to maintain and/or homogenize the ambient pressure on or around the combination bearing bush.

If a spacer disk is provided and is formed integrally and/or materially with the combination bearing bush, an advantageous further development also provides that at least one third venting channel extending in the radial direction through the spacer disk to at least one of the axial bearing surfaces or to the respective axial bearing gap is provided for decoupling at least one of the axial gas cushions or the two axial gas cushions from one another. The at least one third venting channel is also designed in particular to maintain and/or homogenize an ambient pressure on the combination bearing bush or around the combination bearing bush.

Preferably, the combination bearing bush is solid. Alternatively or additionally, the combination bearing bush can be designed to dissipate heat from the axial bearing surface and the radial bearing surface radially outwards and in particular to conduct it to a cooling medium and/or a heat sink. In particular, the receiving body can also be integrally designed as a heat sink and, for example, be formed with cooling fins.

Furthermore, the aerodynamic bearing can comprise the shaft sleeve which is non-rotationally connected to the shaft and which is connected to the shaft, for example, by a fastening element. Alternatively, the bearing may comprise the shaft with a shaft sleeve integrally formed thereon and/or materially connected to the shaft.

A further aspect of the disclosure also relates to a turbo compressor with an aerodynamic bearing proposed according to the disclosure. The turbo compressor, which is specifically designed as an axial, radial or diagonal compressor, has a receiving body designed, for example, as a housing, which defines a cylindrical receiving space for receiving the combination bearing bush. Furthermore, the turbo compressor has retaining webs which extend in the radial direction into the receiving space and are preferably formed integrally, namely in one piece, with the receiving body, which are designed to hold the combination bearing bush in the receiving space concentrically to the rotation axis.

In the circumferential direction between the retaining webs and limited radially inward by the combination bearing bush, at least one axial channel running correspondingly in the axial direction, namely parallel to the rotation axis, can also be provided for homogenizing an ambient pressure prevailing around the combination bearing bush. Preferably, a respective axial channel is provided between each two adjacent retaining webs, which in turn are evenly distributed in particular in the circumferential direction.

Additionally or alternatively, at least one circumferential channel extending in the circumferential direction is provided, intersecting the retaining webs in the circumferential direction and delimited radially inward by the combination bearing bush, for homogenizing an ambient pressure prevailing around the combination bearing bush.

For both the axial channel(s) and the circumferential channel(s), the at least one first venting channel and/or the at least one second venting channel and/or the at least one third venting channel can open into one of the channels or several of the channels.

Preferably, the at least one first venting channel and/or the at least one second venting channel and/or the at least one third venting channel each open into an intersection point of an axial channel with a circumferential channel.

The features disclosed above can be combined in any way as long as such combination is technically feasible and said features do not contradict one another.

BRIEF DESCRIPTION OF THE DRAWINGS

Other advantageous developments of the disclosure are characterized in the dependent claims and will be described in greater detail in the following, in conjunction with the description of the preferred embodiment of the disclosure, with reference to the figures. In the figures:

DETAILED DESCRIPTION

Figure 1:
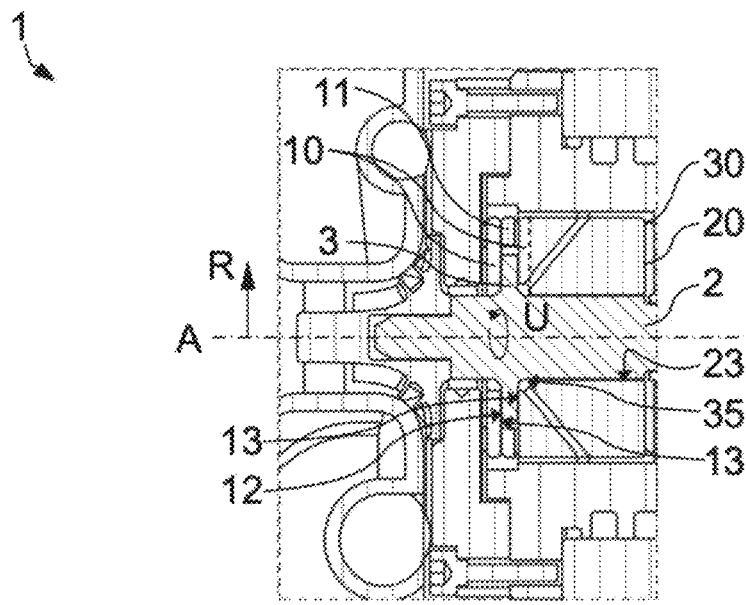
FIG. 1 shows a sectional view of a first aerodynamic bearing.

The figures are exemplary schematics and each show partial sectional views of various aerodynamic bearings 1 or sectional views of turbo compressors with aerodynamic bearings 1 arranged or accommodated therein. The same reference numerals in the figures indicate the same functional and/or structural features, wherein not every feature or every reference numeral is necessarily referred to in every figure.

Figure 2:
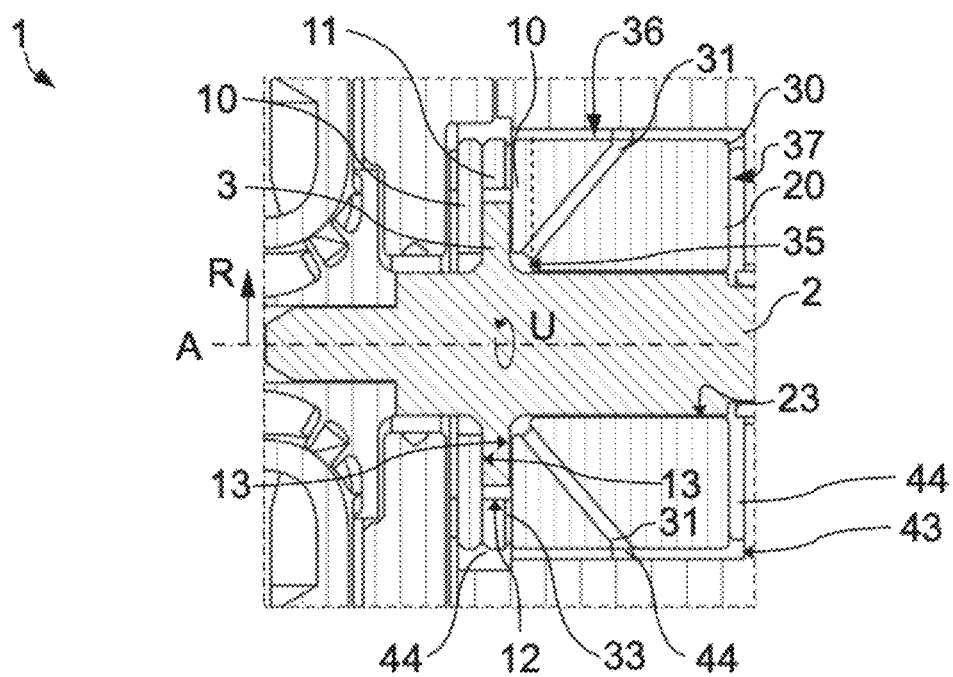
FIG. 2 shows a sectional view of a second aerodynamic bearing.
Figure 3:
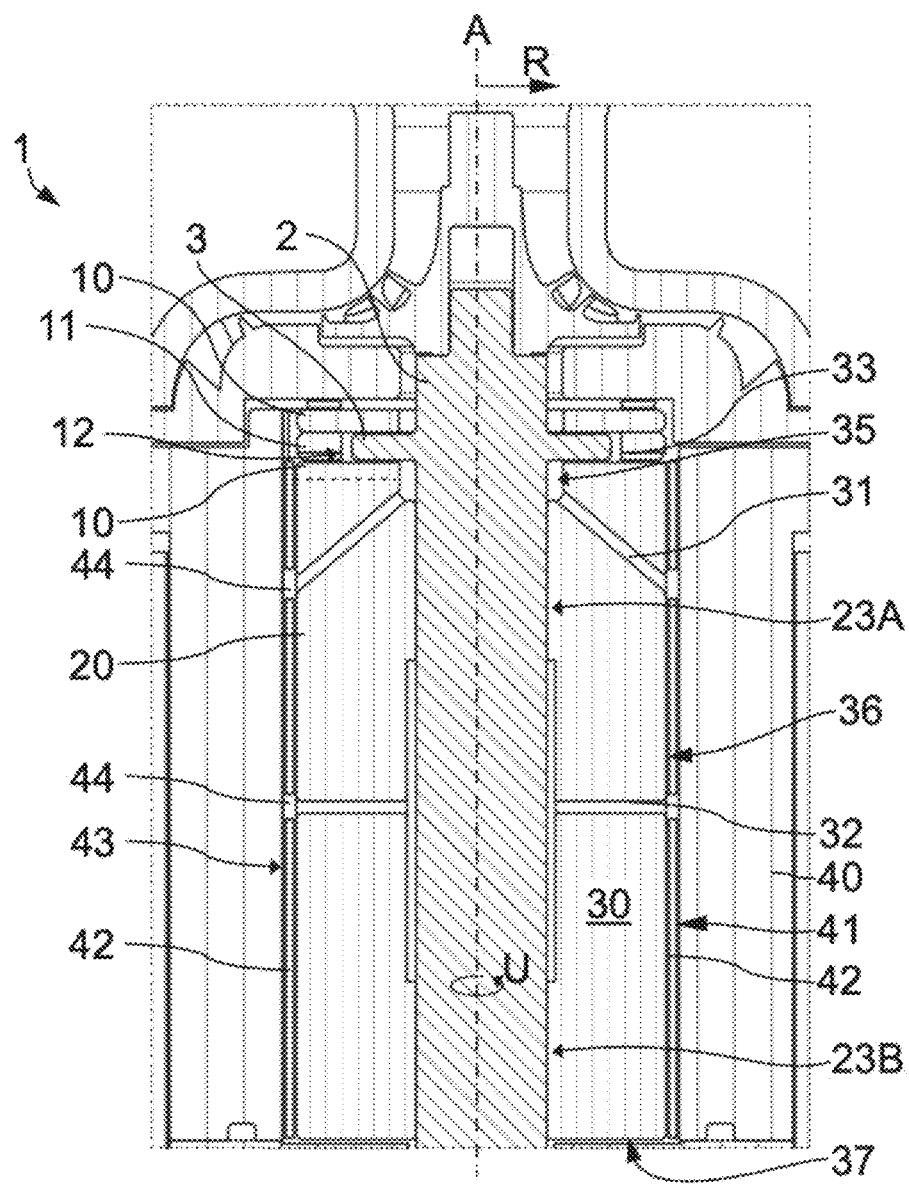
FIG. 3 shows a sectional view of a third aerodynamic bearing.

Basically, for all FIGS. 1 to 3 or for all aerodynamic bearings 1 shown, it holds that these are designed for both axial and radial mounting of a shaft 2 extending along a rotation axis A, wherein the shaft 2 has an integral shaft sleeve 3 which extends radially outward from the shaft 2 in the radial direction R.

For the axial mounting, the aerodynamic bearing 1 has two annular axial bearing disks 10, which are spaced apart by a spacer disk 11 in the axial direction, namely along the rotation axis A, and are held at a predetermined distance, so that a cavity 12 is formed for receiving the shaft sleeve 3.

When the shaft sleeve 3 or the shaft 2 rotates in the circumferential direction U about the rotation axis A, an air or gas cushion is built up between the shaft sleeve 3 and the axial bearing disks 10 or on the axial bearing surface 13 provided on the axial bearing disks 10 and facing the cavity 12.

For radial mounting, the aerodynamic bearing 1 further comprises a hollow-cylindrical radial bearing bush 20 which annularly surrounds the shaft 2 and has a radially inner radial bearing surface 23, so that a gas or air cushion can also be formed between the radial bearing surface 23 of the radial bearing bush 20 and the shaft 2 or a radial bearing surface provided thereon.

In the prior art, the axial mounting and radial mounting are usually separated, which has various disadvantages.

According to the disclosure and as shown in FIGS. 1 to 3, it is particularly proposed that the radial bearing bush 20 is formed integrally with one of the axial bearing disks 10 in the form of a combination bearing bush 30, which on the one hand leads to a saving in installation space and on the other hand to improved cooling, since the heat generated at the axial bearing disk 10 and the radial bearing bush 20 can be dissipated more easily and to a better extent. In addition, the alignment of the axial bearing disk 10 or the radial bearing bush 20 is no longer necessary, since they are arranged and aligned together as a combination bearing bush 30.

In order to prevent a collision of the axial bearing disk 10 of the combination bearing bush 30 or its axial bearing surface 13 or a collision of the radial bearing bush 20 of the combination bearing bush 30 or its radial bearing surface 23 with the shaft sleeve 3 on the one hand and to decouple a gas cushion on the axial bearing surface 13 from a gas cushion on the radial bearing surface on the other hand, a concave transition region 35 designed as an undercut is also provided in each case, so that the axial bearing surface 13 and the radial bearing surface 23 of the combination bearing bush 30 do not directly adjoin one another.

For the function of the aerodynamic bearing 1, it is advantageous that the respective bearing surfaces, namely the axial bearing surfaces 13 and the radial bearing surface 23, are in intended interacting connection with an environment of the bearing 1, so that the pressure distribution on the bearing surfaces 13, 23 is maintained as intended and remains uniform. For this purpose, as shown in particular in FIGS. 2 and 3, venting channels 31, 32, 33 are provided, through which an ambient pressure around the aerodynamic bearing 1 and the pressure distribution on the bearing surfaces 13, 23 are homogenized.

A first venting channel 31 connects a radially outer surface 36 or, via this, also an axial end face 37 of the combination bearing bush 30 with the transition region 35.

Furthermore, in FIGS. 2 and 3, a third venting channel 33 is also shown, which connects the cavity 33 with the surroundings of the aerodynamic bearing 1.

With reference to the aerodynamic bearing 1, FIG. 3 also shows a variant with an improved radial support, in which the radial bearing surface 23 is divided into two portions 23A, 23B spaced apart along the axis of rotation A, each of which provides a part of the radial bearing surface 23 or a respective radial bearing surface 23.

For pressure decoupling of the radial bearing surfaces 23 of the radial bearing portions 23A, 23B, a second venting channel 32 is provided between them, which leads radially outward to the circumferential surface 36 of the combination bush 30.

For all FIGS. 1 to 3, it holds that a section of a turbo compressor is shown, which is particularly clearly visible in FIG. 3. The turbo compressor has a receiving body 40, which can also be referred to as a housing or inner housing, with a receiving space 41 for receiving the aerodynamic bearing 1. Retaining webs 42 extend into the receiving space 41 and hold the combination bearing bush 30 concentrically to the rotation axis A.

In the axial direction, namely parallel to the axis of rotation A, an axial channel 43 is provided between the retaining webs 42 for homogenizing the ambient pressure prevailing in the receiving space 41, wherein for this purpose circumferential channels 44 are additionally provided which intersect the retaining webs 42 in the circumferential direction U and which are also preferably directly actively connected to the venting channels 31, 32, 33, namely adjoin them.

The disclosure is not limited in its embodiment to the preferred exemplary embodiments provided above. Rather, a number of variants is conceivable, which make use of the presented solution even with fundamentally different designs.

The invention claimed is:

1. An aerodynamic bearing for the axial and radial mounting of a shaft extending along a rotation axis for a turbo compressor, the aerodynamic bearing comprising:
two annular axial bearing disks and a hollow cylindrical radial bearing bush,
wherein the two axial bearing disks and the radial bearing bush are arranged concentrically to the rotation axis,
wherein the two axial bearing disks are spaced apart in the axial direction and form a cavity between them in the axial direction for receiving a shaft sleeve connected to the shaft,
wherein the two axial bearing disks each have an axial bearing surface facing the cavity for forming a respective axial gas cushion in a respective axial bearing gap between the respective axial bearing surface and the shaft sleeve for the axial mounting of the shaft,
wherein the radial bearing bush has a radial bearing surface radially inward for forming a radial gas cushion in a radial bearing gap between the radial bearing surface and the shaft for the radial mounting of the shaft, and wherein the radial bearing bush is formed integrally and/or materially with one of the axial bearing disks as a combination bearing bush.

2. The aerodynamic bearing according to claim 1, wherein a spacer disk is arranged in the axial direction between the two axial bearing disks, which spacer disk is designed to hold the axial bearing disks at a predetermined axial distance from one another and/or to delimit the cavity in the radial direction, so that the shaft sleeve, when mounted as intended between the axial bearing disks by the axial gas cushions, is rotatable, and wherein the spacer disk is formed integrally and/or materially with the combination bearing bush.

3. The aerodynamic bearing according to claim 2, further having at least one third venting channel extending in the radial direction through the spacer disk to at least one of the axial bearing surfaces for decoupling at least one of the axial gas cushions.

4. The aerodynamic bearing according to claim 1, wherein the combination bearing bush has a hollow cylindrical shape, the length of which corresponds to a common axial length of the radial bearing bush and the axial bearing disk and the outer radius of which corresponds to an outer radius of the axial bearing disk.

5. The aerodynamic bearing according to claim 1, wherein the axial bearing surface and the radial bearing surface on the combination bearing bush transition through a transition region which runs concentrically around the rotation axis and is concave and configured as an undercut.

6. The aerodynamic bearing according to claim 1, further having at least one first venting channel leading to the axial bearing surface and to the radial bearing surface of the combination bearing bush for decoupling the axial gas cushion and the radial gas cushion.

7. The aerodynamic bearing according to claim 6, wherein the at least one first venting channel leads to the transition region, via which the at least one first venting channel is fluidically connected to the axial bearing surface and the radial bearing surface.

8. The aerodynamic bearing according to claim 6, wherein the at least one first venting channel leads from the radial bearing surface to a radially outer circumferential surface and/or an axial end face of the combination bearing bush and is configured to maintain an ambient pressure of the combination bearing bush.

9. The aerodynamic bearing according to claim 1, wherein the radial bearing surface of the combination bearing bush is divided into at least two radial bearing surface portions spaced apart in the axial direction for forming a respective radial gas cushion between the respective radial bearing surface portion and the shaft for the radial mounting of the shaft.

10. The aerodynamic bearing according to claim 9, further having at least one second venting channel arranged between two radial bearing surface portions and leading to the radial bearing surface portions for decoupling the adjacent radial gas cushions.

11. The aerodynamic bearing according to claim 1, wherein the combination bearing bush is solid and/or wherein the combination bearing bush is designed to dissipate heat from the axial bearing surface and the radial bearing surface radially outward to conduct it to a cooling medium and/or a heat sink.

12. The aerodynamic bearing according to claim 1, further comprising the shaft sleeve non-rotationally connected to the shaft in particular by a fastening element or further comprising the shaft with the shaft sleeve integrally formed thereon and/or materially connected thereto.

13. A turbo compressor with an aerodynamic bearing according to claim 1, having a receiving body which defines a cylindrical receiving space for receiving the combination bearing bush, further comprising retaining webs extending in the radial direction into the receiving space and which are designed to hold the combination bearing bush in the receiving space concentrically to the rotation axis.

14. The turbo compressor according to claim 13, wherein in the circumferential direction between the retaining webs and delimited radially inward by the combination bearing bush at least one axial channel is provided for homogenizing an ambient pressure prevailing around the combination bearing bush, and/or wherein at least one circumferential channel is provided, which intersects the retaining webs in the circumferential direction and which is delimited radially inward by the combination bearing bush, for homogenizing an ambient pressure prevailing around the combination bearing bush.

* * * * *